(12) United States Patent
Ray et al.

(10) Patent No.: US 11,636,363 B2
(45) Date of Patent: Apr. 25, 2023

(54) COGNITIVE COMPUTER DIAGNOSTICS AND PROBLEM RESOLUTION

(71) Applicant: International Business Machines Corporation, Armonk, NY (US)

(72) Inventors: Shubhadip Ray, Secaucus, NJ (US); Andrew S. Christiansen, Dubuque, IA (US); Norbert Herman, Denver, CO (US); Avik Sanyal, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 1467 days.

(21) Appl. No.: 15/899,991

(22) Filed: Feb. 20, 2018

(65) Prior Publication Data

US 2019/0258948 A1    Aug. 22, 2019

(51) Int. Cl.
*G06N 5/04* (2023.01)
*G06Q 30/00* (2023.01)
*G06N 5/045* (2023.01)
*G06Q 30/016* (2023.01)

(52) U.S. Cl.
CPC .......... *G06N 5/045* (2013.01); *G06Q 30/016* (2013.01)

(58) Field of Classification Search
CPC ........ G06N 5/045; G06N 5/003; G06N 7/005; G06N 20/10; G06N 20/20; G06N 3/0427; G06N 5/022; G06Q 30/016
See application file for complete search history.

(56) References Cited

U.S. PATENT DOCUMENTS

| | | | |
|---|---|---|---|
| 5,157,668 A | 10/1992 | Buenzli, Jr. et al. | |
| 6,012,152 A | 1/2000 | Douik et al. | |
| 6,397,245 B1 | 5/2002 | Johnson, II et al. | |
| 6,813,733 B1 | 11/2004 | Li et al. | |
| 6,944,800 B2 | 9/2005 | Brundridge et al. | |
| 7,194,445 B2 | 3/2007 | Chan et al. | |
| 8,667,114 B2 | 3/2014 | Nakajo | |
| 2016/0358081 A1 | 12/2016 | Cama et al. | |
| 2018/0307756 A1* | 10/2018 | Garay | G06N 5/003 |
| 2018/0365027 A1* | 12/2018 | Khudia | G06Q 30/016 |
| 2019/0228315 A1* | 7/2019 | Xu | G06F 16/3346 |

OTHER PUBLICATIONS

"Sparks, (Differentiated Instruction: A Primer), Jan. 28, 2015" (Year: 2015).*
"Mouseflow, (Mouseflow: Do you know your users?), Oct. 31, 2017" (Year: 2017).*
Li, Huajing, et al. "SolutionFinder: intelligent knowledge integration and dissemination for solution retrieval in it support services." 2009 IEEE International Conference on Services Computing. IEEE, 2009. (Year: 2009).*

(Continued)

*Primary Examiner* — Benjamin P Geib
(74) *Attorney, Agent, or Firm* — Monchai Chuaychoo; Hunter E. Webb; Keohane & D'Alessandro, PLLC

(57) ABSTRACT

Disclosed embodiments provide techniques for automated technical support based on cognitive capabilities and preferences of a user. A user profile is obtained which includes a skill level assessment. A solution path includes one or more potential solutions for a problem. One or more solutions in the solution path are presented to a user as a potential remedy for a technical problem, based on the cognitive capabilities and preferences of a user.

20 Claims, 17 Drawing Sheets

(56) References Cited

OTHER PUBLICATIONS

Kim, Sung-Su et al., "Autonomic Fault Management based on Cognitive Control Loops", 2012, IEEE/IFIP 4th Workshop on Management of the Future Internet (ManFI), 7 pgs.

Jia, Rui et al., "Towards Proactive Fault Management of Enterprise Systems", 2015 International Conference on Cloud and Autonomic Computing, 12 pgs.

Ho, L. Lawrence et al., "Real-Time Performance Monitoring and Anomaly Detection in the Internet: An Adaptive, Objective-Driven, Mix-and-Match Approach", Bell Labs Technical Journal, Oct.-Dec. 1999, 19 pgs.

Ditomaso, Dominic, "Dynamic Error Mitigation in NoCs using Intelligent Prediction Techniques", 2016 IEEE, 12 pgs.

Tom'sHARDWARE, The Authority on Tech, "After doing my windows updates I have no sound", http://www.tomshardware.com/answers/id-3086973/windows-updates-sound.html, Jun. 11, 2016, 3 pages.

\* cited by examiner

| TIME | DISTANCE | ACTION |
|---|---|---|
| 241ms | 3.2 cm | move |
| 88ms | 0 cm | click |
| 76ms | 0.4 cm | move |
| 60ms | 0 cm | click |
| 109ms | 1.1 cm | move |
| 84ms | 0 cm | dbl-click |

FIG. 4

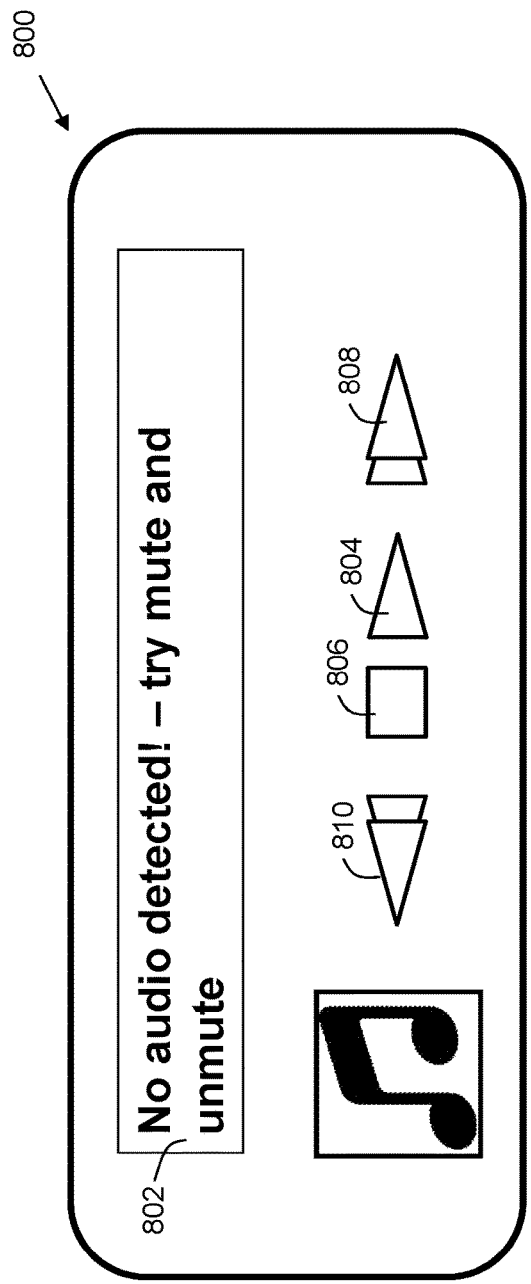

FIG. 8

```
Nov 7 13:27:44 ubuntu pulseaudio[1441]: ratelimit.c: 94 events suppressed
Nov 7 13:36:00 ubuntu pulseaudio[1441]: alsa-sink.c: ALSA woke us up to write new
data to the device, but there was actually nothing to write!
Nov 7 13:36:00 ubuntu pulseaudio[1441]: alsa-sink.c: Most likely this is a bug in
the ALSA driver 'snd_via82xx'.
Nov 7 13:36:00 ubuntu pulseaudio[1441]: alsa-sink.c: We were woken up with POLLOUT
set -- however a subsequent snd_pcm_avail() returned 0 or another value <
min_avail.
Nov 7 13:54:14 ubuntu pulseaudio[1441]: ratelimit.c: 88 events suppressed
Nov 7 13:56:21 ubuntu pulseaudio[1441]: ratelimit.c: 89 events suppressed
```

However, when the threshold criteria are met, you might find that the processor may determine whether the data storage medium unit has a threshold amount of free storage space available to perform diagnostic testing which may include for example intrusive error checking. Our goal is to have the computer storage — 1702C space that includes for example sufficient disk sectors being available on a disk. When there is insufficient computer storage space, then the processor may continue operating the data storage medium unit until, for example, enough computer storage space becomes available.

COGNITIVE COMPUTER DIAGNOSTICS AND PROBLEM RESOLUTION

FIELD

Embodiments of the invention relate to problem resolution in devices and, more particularly, to cognitive computer diagnostics and problem resolution.

BACKGROUND

People use many consumer computing devices today, such as laptop computers, desktop computers, tablet computers, smartphones, etc. Some people may be extremely proficient or experts in how such devices function, and therefore find it easy to troubleshoot when a problem arises. However, other people may only have basic knowledge of how to use a device and be unfamiliar with how to troubleshoot when a problem arises. There exists a need for improvements in computer diagnostics and problem resolution.

SUMMARY

In one embodiment, there is provided a computer implemented method for device technical support for a user, comprising: determining a user cluster corresponding to the user; detecting a device problem on an electronic device corresponding to the user; determining a solution path for the device problem, wherein the solution path is based on the device problem and the user cluster; providing instructions corresponding to the solution path to the user; determining a solution path success result; and recording the solution path success result.

In another embodiment, there is provided an electronic computing device comprising: a processor; a memory coupled to the processor, the memory containing instructions, that when executed by the processor, perform the steps of: determining a user cluster corresponding to a user; detecting a device problem on an electronic device corresponding to the user; determining a solution path for the device problem, wherein the solution path is based on the device problem and the user cluster; providing instructions corresponding to the solution path to the user; determining a solution path success result; and recording the solution path success result.

In yet another embodiment, there is provided a computer program product for an electronic computing device comprising a computer readable storage medium having program instructions embodied therewith, the program instructions executable by a processor to cause the electronic computing device to: determine a user cluster corresponding to a user; detect a device problem on an electronic device corresponding to the user; determine a solution path for the device problem, wherein the solution path is based on the device problem and the user cluster; provide instructions corresponding to the solution path to the user; determine a solution path success result; and record the solution path success result.

BRIEF DESCRIPTION OF THE DRAWINGS

Features of the disclosed embodiments will be more readily understood from the following detailed description of the various aspects of the invention taken in conjunction with the accompanying drawings.

FIG. 4 shows a timing table for a user interface navigation analysis.

FIG. 8 shows an exemplary device message with a suggested solution.

FIG. 9 shows an example of retrieving information from a device log on an electronic device.

FIG. 17 shows an example of a bigram analysis in accordance with embodiments of the present invention.

Figure 1:
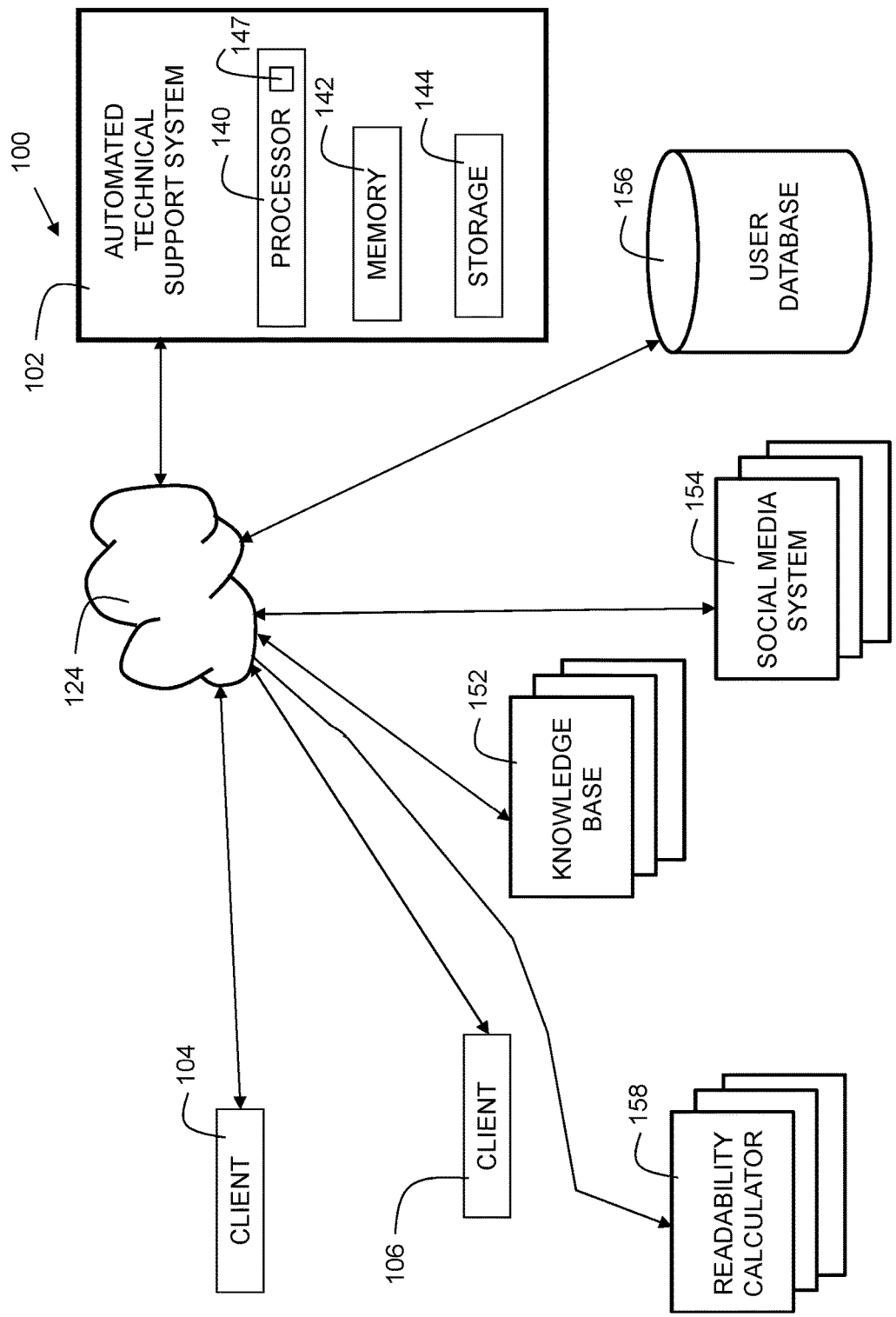
FIG. 1 is a diagram for an environment of embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

Disclosed embodiments provide techniques for automated technical support based on cognitive capabilities and preferences of a user. Conventional automated help programs provide the same instructions for troubleshooting to every user, making no differentiation based on experience, skill level, and other profile attributes. These conventional programs also do not differentiate based on what has worked or not worked for users with different experience, skill levels, and other profile attributes. With disclosed embodiments, a user profile is obtained which includes a skill level assessment. A solution path includes one or more potential solutions for a problem. One or more solutions in the solution path are presented to a user as a potential remedy for a technical problem, based on the cognitive capabilities, preferences, and profile of a user.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, and/or elements.

FIG. 1 is a diagram 100 for an environment of embodiments of the present invention. An automated technical support system 102 is in communication with network 124. Network 124 may be the Internet, a wide area network, local area network, or any other suitable type of network. System 102 has a processor 140, memory 142, and storage 144. Instructions 147 are located in memory 142, which, when executed by the processor, cause system 102 to perform the elements of embodiments of the present invention. Client devices are in communication with system 102. Client devices 104, 106 may be desktop computers, laptop computers, tablets, smartphones, or other suitable devices. Client devices may communicate with system 102 over the network 124.

Knowledge base 152, social media system 154, user database 156, and readability calculator 158 are also in communication with network 124. Knowledge base 154 can include, or have access to, websites, databases, or other repositories of known technical solutions, such as an IBM® helpdesk website. Social media system 154 includes one or more social networking systems. Examples include Facebook®, Twitter®, Instagram®, and/or any other suitable social media system. User database 156 includes data about one or more users obtained from readability calculations of writing samples, click speed, type speed, or other suitable media or methods. Readability calculator 158 monitors the user's typing and/or speech utterances. Based on an analysis of the wording, grammar, spelling, etc., data about the user can be determined, such as probabilities that the user is an adult or child, probability of particular education levels, or other suitable determinations. System 102 may access data from and/or store data to knowledge base 152, social media system 154, user database 156, and readability calculator 158.

Figure 2:
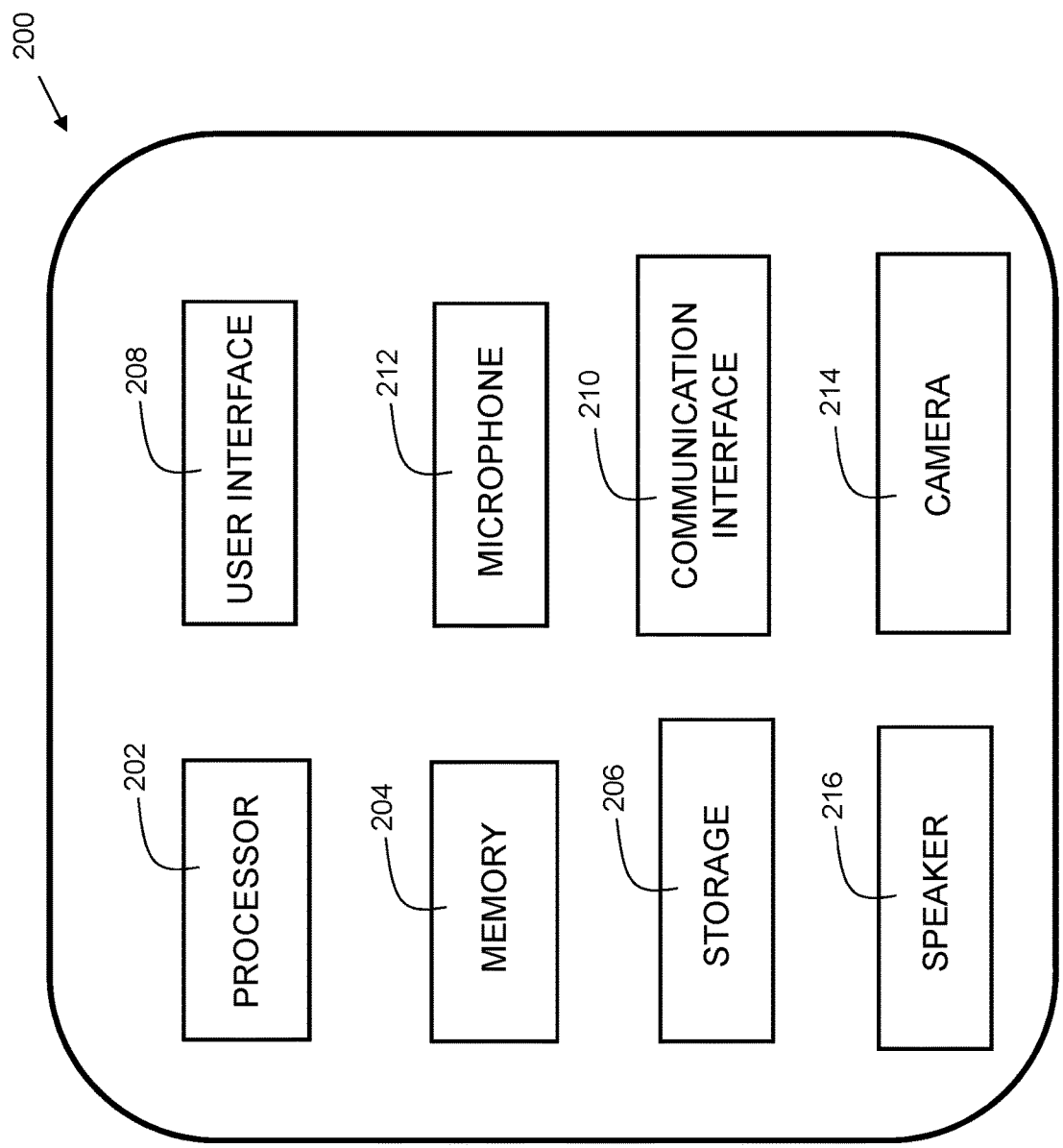
FIG. 2 is a device in accordance with embodiments of the present invention.

FIG. 2 is a block diagram of a device in accordance with embodiments of the present invention. The client devices (104 and 106) of FIG. 1 may also be of a similar structure to device 200. Device 200 is an electronic computing device. Device 200 includes a processor 202, which is coupled to a memory 204. Memory 204 may include dynamic random access memory (DRAM), static random access memory (SRAM), magnetic storage, and/or a read only memory such as flash, EEPROM, optical storage, or other suitable memory. In some embodiments, the memory 204 may not be a transitory signal per se. Memory 204 stores instructions, which when executed by the processor, implement the steps of the present invention.

Device 200 further includes storage 206. In embodiments, storage 206 may include one or more magnetic storage devices such as hard disk drives (HDDs). Storage 206 may additionally include one or more solid state drives (SSDs).

Device 200 further includes a user interface 208, examples of which include a liquid crystal display (LCD), a plasma display, a cathode ray tube (CRT) display, a light emitting diode (LED) display, an organic LED (OLED) display, or other suitable display technology. The user interface 208 may further include a keyboard, mouse, or other suitable human interface device. In some embodiments, user interface 208 may be a touch screen, incorporating a capacitive or resistive touch screen in some embodiments.

The device 200 further includes a communication interface 210. The communication interface 210 may be a wired communication interface that includes Ethernet, Gigabit Ethernet, or the like. In embodiments, the communication interface 210 may include a wireless communication interface that includes modulators, demodulators, and antennas for a variety of wireless protocols including, but not limited to, Bluetooth™, Wi-Fi, and/or cellular communication protocols for communication over a computer network.

Device 200 may further include camera 214. The camera may be integral with the device as shown, or connected thereto via a wired or wireless connection. The device 200 may further include a microphone 212 used for making recordings, phone calls, or other sound recordings. The device 200 may further include speaker 216, which can be used for presenting audio to the user. The audio can include music or other audio-only media, and/or audio soundtracks from video media.

Figure 3A:
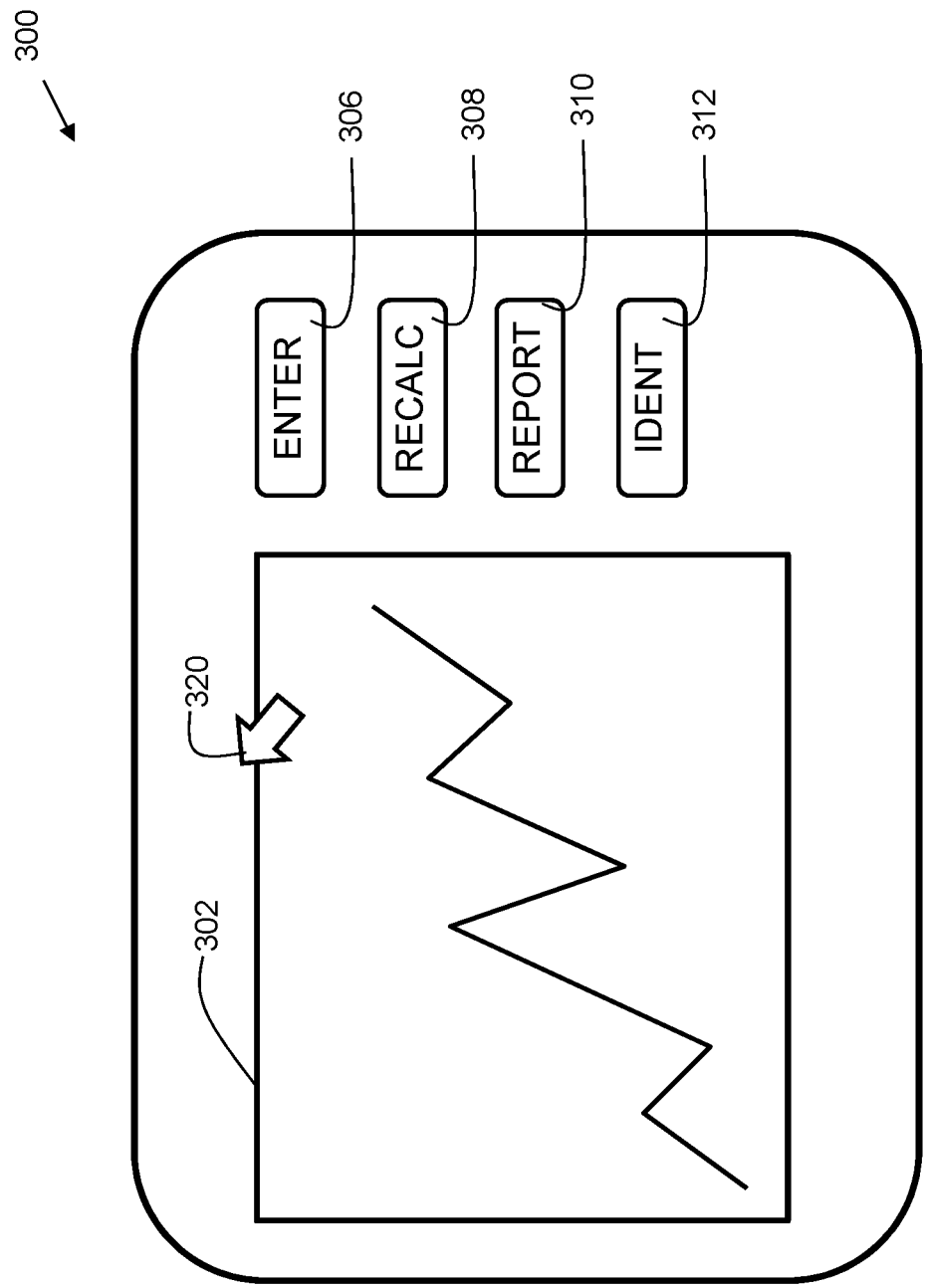
FIG. 3A and FIG. 3B show examples of performing a user interface navigation analysis of a user.
Figure 3B:
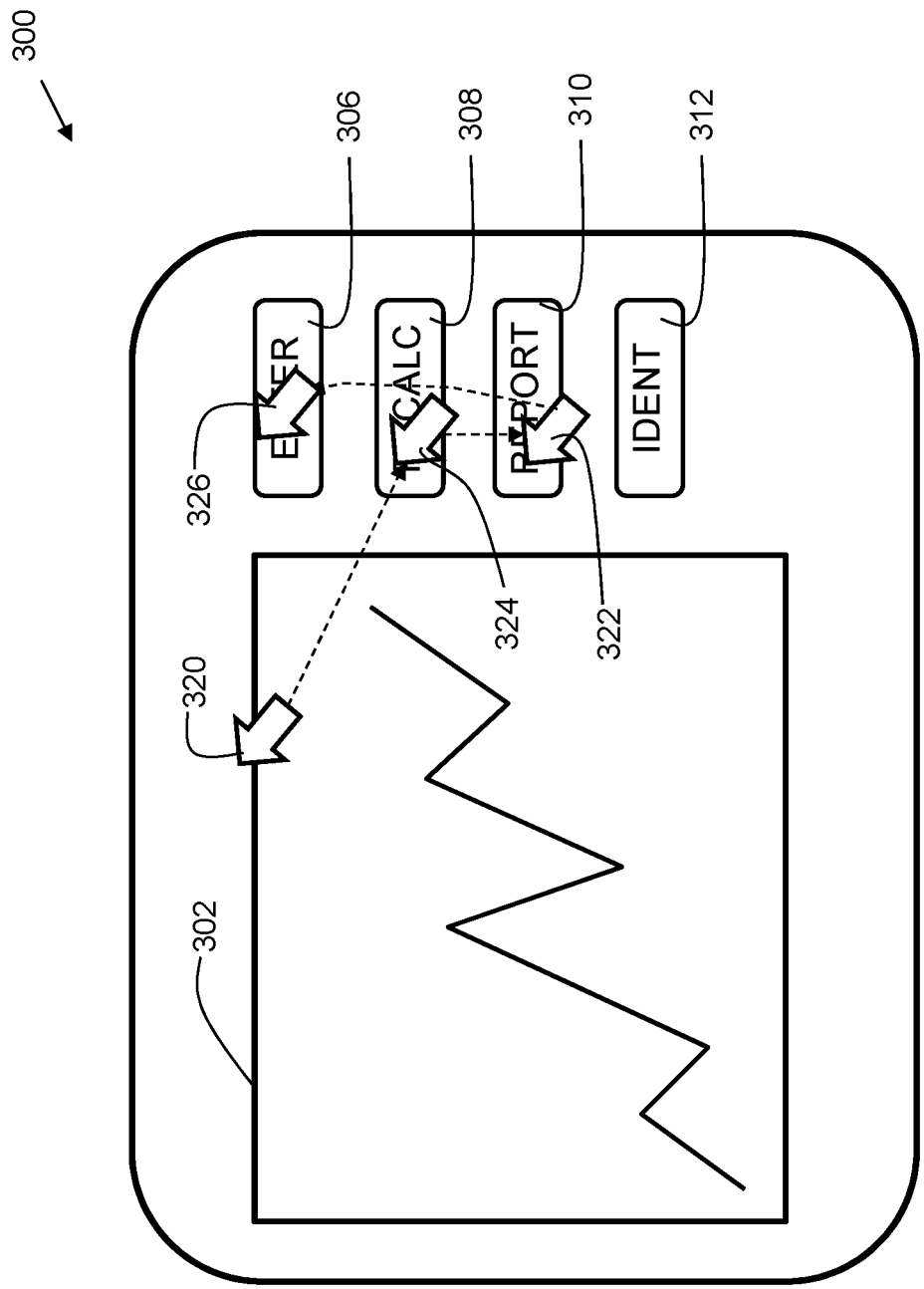

FIG. 3A and FIG. 3B show examples of performing a user interface navigation analysis for a user. FIG. 3A shows an example of a user interface screen 300. In the example, screen 300 includes an image 302, which is a graph. Screen 300 further includes button 306 for initiating an enter operation, button 308 for initiating a recalculation operation, button 310 for initiating a report generation operation, and button 312 for initiating an identifying operation. The user interface 300 is merely presented as an example to illustrate user interface navigation analysis. A cursor is also included at 320. Cursor 320 can be moved around the user interface by the user via a mouse, a stylus, or finger on a touch screen, etc. FIG. 3B shows the user interface 300 with a dashed line representing movement of the cursor 320 by the user. As shown, the cursor starts at the location indicated by 320. It is then moved by the user to position 324 where the user clicks the recalculation button 308. The cursor is then moved by the user to position 322 where the user clicks on the report button 310. The cursor is then moved by the user to position 326 where the user double clicks on the enter button 306.

FIG. 4 shows a timing table 400 for an example user interface navigation analysis. In embodiments, determining a user experience level comprises performing a user interface navigation analysis of the user. In embodiments, the analysis may take into account the cursor path, click speed, type speed, etc. In the example table 400, three columns are shown. The columns are titled "time" 402, "distance" 404, and "action" 406. Action column 406 shows the nature of user actions, such as move, click, or double-click. The time column 402 indicates the timing between actions, and the distance column 404 shows the distance traveled by the cursor between actions. Attributes such as these may be analyzed to determine a particular user's level of proficiency (i.e., experience or skill, etc.) with a particular application, operating system, use of a computing device in general, or other suitable indicators. Various thresholds may be set or predetermined for classifying a user based on the analysis. Various levels may be set or predetermined such as novice, intermediate, proficient, and/or expert. The various thresholds may be associated with the different levels for classifying users into particular experience levels. For example, if a user is operating the cursor very quickly, with relatively short times between actions, then the user may be deemed to be an experienced user. Conversely, if a user is operating the cursor slowly, then the user may be deemed to be a novice or inexperienced user. In some embodiments, a threshold of, for example, 500 milliseconds may be used to determine the proficiency level. In embodiments, an average of the times recorded in column 402 is computed. If the average of the times over a particular usage period (e.g., two minutes) exceeds the threshold (e.g., 500 milliseconds), then the user may be deemed to be a novice for the computer system and/or active application. If the average of the times is less than or equal to the threshold, then the user may be deemed to be an experienced user for the computer system and/or active application.

As shown in FIG. 4, the attributes from the example of FIG. 3B are detected and recorded as follows. Row 410 represents the cursor's move from position 320 a distance of 3.2 centimeters to position 324. Row 412 represents the click at position 324 of recalculation button 308. Row 414 represents the cursor's move from position 324 a distance of 0.4 centimeters to position 322. Row 416 represents the click at position 322 of report button 310. Row 418 represents the cursor's move from position 322 a distance of 1.1 centimeters to position 326. Row 420 represents the double-click at position 326 of enter button 306.

Figure 5:
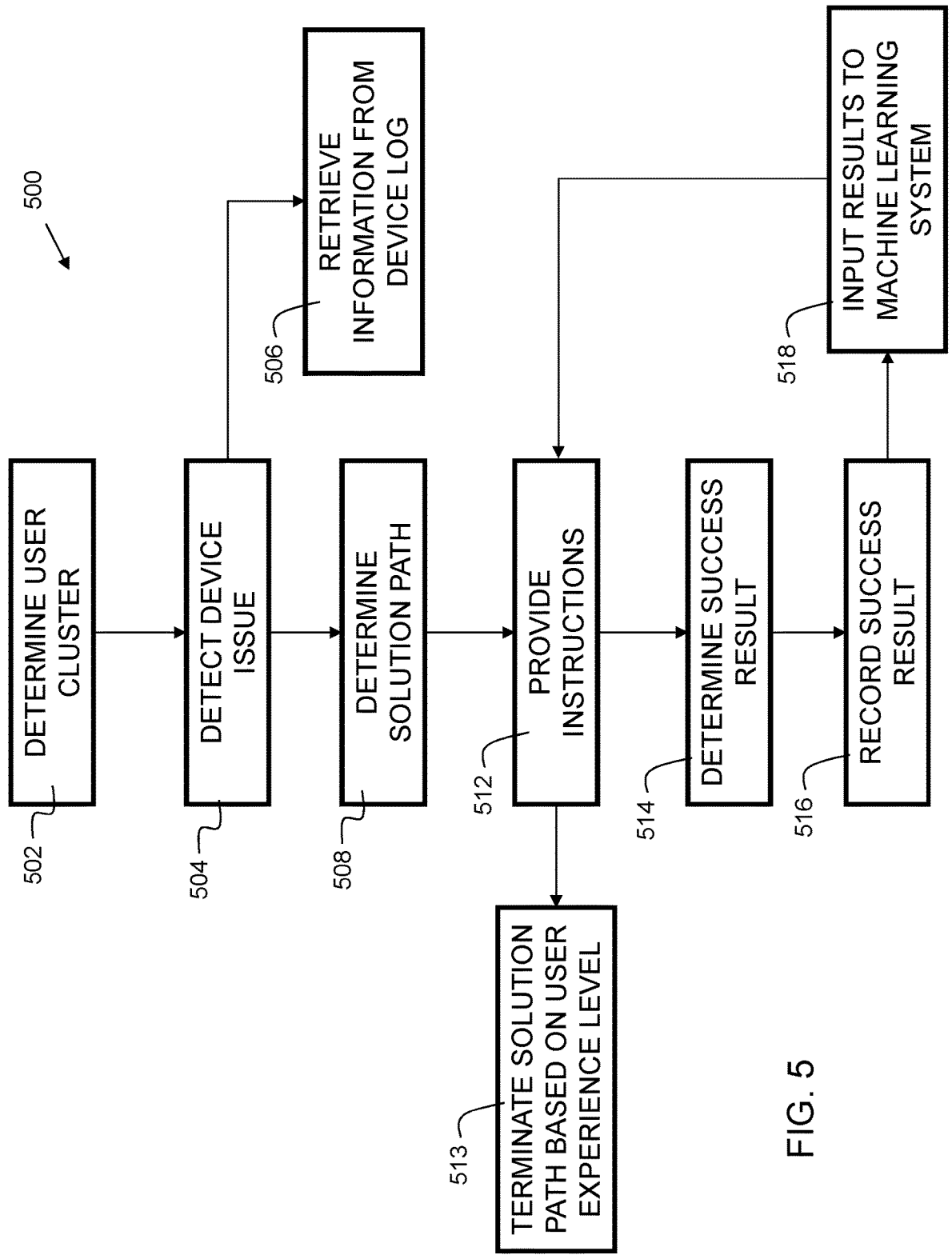
FIG. 5 is a flowchart indicating process steps for embodiments of the present invention.

FIG. 5 is a flowchart 500 indicating process steps for embodiments of the present invention. At 502, a user cluster is determined. In embodiments, determining the user cluster that a particular user belongs to comprises determining a proficiency level (i.e., skill or experience, etc.) for a particular user and using analytics clustering techniques on user profile attributes. A user cluster can represent a category of experience (e.g., beginner, intermediate, expert, etc.), a category of application switch frequency (how often the user switches between software applications), such as low, medium, or high, a category of user interface navigation speed, such as low, medium, or high, and/or other suitable indicators. These are examples of categories and subcategories, and any suitable ones may be substituted. Embodiments determine the user cluster via an analysis, such as a user interface navigation analysis.

At 504, a device problem is detected. For example, a user may be trying to listen to audio through a software application installed on a computing device, but finds that the application is malfunctioning (i.e., there is a problem). Another example is that the Internet or network connection may be slow. Yet another example is that a connected peripheral such as a scanner or printer is not functioning properly. These are only examples, and troubleshooting of any device problem/malfunction is possible with disclosed embodiments.

At 506, information may be retrieved from a log. In some embodiments, detecting the device problem on the electronic device comprises retrieving information from a device log on the electronic device. The log may be retrieved from the electronic device by the automated technical support system. Referring again to FIG. 1, the automated technical support system 102 may retrieve one or more log files from client device 104 as part of the troubleshooting process. In embodiments, the automated technical support system 102 may utilize file transfer protocol (ftp), secure shell (ssh), hypertext transfer protocol (HTTP), or other suitable mechanism. In some embodiments, multiple log files may be transferred from the electronic device to the automated technical support system. In some embodiments, the multiple log files may be converted to a single compressed file utilizing utilities such as tar, zip, or other suitable utilities, in order to simplify the transfer. The single compressed file is then uncompressed by the automated technical support system in order to parse the log files, searching for various signatures of errors and/or warnings that are pertinent to the problem the user is experiencing.

At 508, a solution path is determined. The solution path is the series of instructions that may be presented to the user for troubleshooting to solve the problem causing the device malfunction. The solution path is based on the device problem and the user cluster. In the example pertaining to loss of audio, possible instructional steps may include mute and unmute, reinstalling of the audio driver, editing the registry, and removing the sound card and reinserting it, or replacing the sound card. The extent to which the steps of the solution path are presented may be based on the user cluster with which the user is associated. Depending on the particular user cluster, more or fewer steps may be indicated. For example, if a user is classified into a novice cluster, then only the simpler/easier instructions for solutions provided in a given solution path will be presented, and if none of those result in success, the solution path is terminated. If the user is classified into an expert user cluster, then more difficult instructions for the more complex solutions are presented if necessary before terminating the solution path.

In embodiments, at 512, instructions are provided. The instructions are for solutions of the solution path. The solutions are queued on the solution path with instructions sorted from simplest to most complex. At 513, the solution path is terminated. This may be executed based on the user cluster (i.e., user experience or skill level, etc.). For example, a novice user may not be able to understand and execute the more difficult instructions in the solution path after the simpler instructions fail to result in a problem resolution. Accordingly, the solution path may be terminated if the simpler instructions do not result in a problem resolution. Alternatively, the solution path may be terminated after all instructions have been executed if the user is considered highly proficient or an expert. The solution path is also terminated if one of the solutions in the instructions resolves the problem.

At 514, a success result is determined. It is determined whether and/or to what extent the solution path was successful in getting the device problem resolved by the user following the recommended instructions. At 516, the solution path success result is recorded (e.g., in storage 144 of FIG. 1). At 518, the results are input into a machine learning algorithm or artificial intelligence (AI) system. This enables the system to, over time, "learn" what solutions work and which ones do not work for a given user cluster. The system may then be able to adapt solution paths over time to improve rate of success for each user cluster. Examples of machine learning techniques include artificial neural networks. Artificial neural networks are inspired by animal brains, having connected nodes that transmit signals from one to the other. A neural network is an example machine learning system, and any suitable machine learning system is included within the scope of the invention. Such systems may include, but are not limited to, a support vector machine (SVM), random forest, logistic regression, and/or K-means clustering. The machine learning techniques may include supervised learning and/or unsupervised learning techniques.

Figure 6:
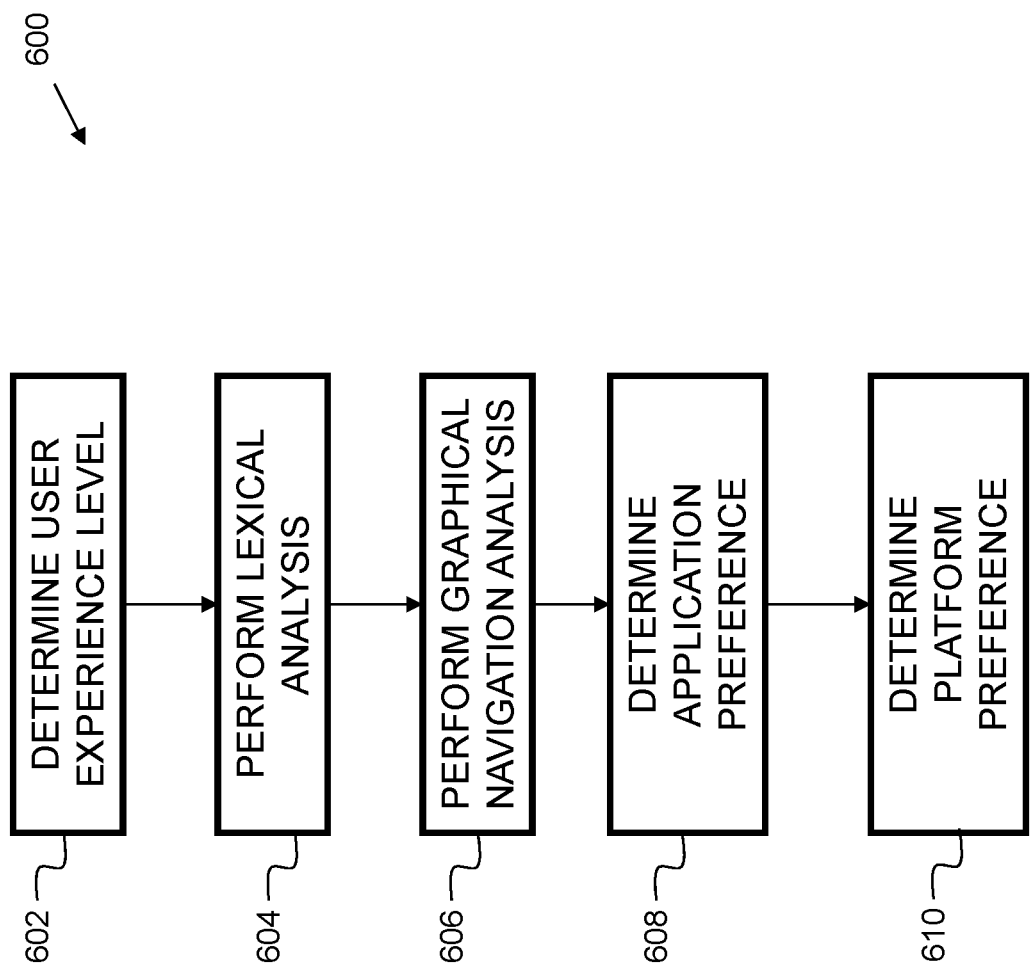
FIG. 6 is a flowchart indicating additional process steps for embodiments of the present invention.

FIG. 6 is a flowchart 600 indicating additional process steps for embodiments of the present invention. At 602, a user experience (or skill) level is determined. In embodiments, determining a user experience level comprises performing a lexical analysis of the user at 604. The lexical analysis may include, but is not limited to, a Flesch Kincaid analysis, an ARI (Automated Readability Index) score computation, and/or a Gunning Fog index computation. Other lexical analysis techniques (e.g., readability calculators 158) are included within the scope of the invention. The analysis can include an analysis of the content that the user types, speaks, or otherwise enters into his/her computer. The analysis determines whether the words are basic or advanced language, whether the grammar is correct, and/or whether the spelling is correct. At 606, a graphical navigation analysis is performed. This may include an analysis of type speed, click speed, spelling accuracy, grammar accuracy, or another suitable metric. The aforementioned analysis may be used to determine an approximate age and/or education level of the user. As an example, if a user is estimated to be an elementary school child based on such analysis, then the solution path may be terminated accordingly, providing only basic troubleshooting tips for the younger user to attempt.

In some embodiments, determining the user cluster comprises determining an application user preference. Accordingly, at 608, an application preference is determined. This may include determining what is the preferred application for a particular task. For example, the determination may include evaluating whether Microsoft® Word®, or Word Perfect® is preferred by the user for typing. In another example, it is determined whether Google® Chrome® or Mozilla® Firefox® is preferred by the user for web browsing. These are examples, and any suitable application preference may be determined. Embodiments may base these or other determinations on historical usage data. The instructions given to the user to implement the solution path are presented in the preferred application.

In some embodiments, determining the user cluster comprises determining a platform preference. Accordingly, at 610, a platform preference is determined. This may include determining whether the user prefers to use iOS® vs. Android, or Windows® vs. Mac®, etc. Embodiments may review the device's system information, registry, log files, hardware registers, and/or other suitable information to determine which platform and/or operating system is in use.

In some embodiments, the platform preference determination may be based on historical usage data. These are examples, and any suitable applicable preference determination is included within the scope of the invention. The solution path may be presented based on the determined preferences. As an example, if the user is experiencing a browser issue, and the user is deemed to prefer Firefox, then the user may be provided solutions for Firefox. In another example, the user may be an experienced Firefox user, but is using a website that requires a different browser, such as Chrome. In such a scenario, the system may recognize, based on previous usage, that the user is inexperienced in the use of Chrome, and thus may treat the user as a novice when preparing a solution path for a problem involving the Chrome browser. These are merely examples, and other troubleshooting scenarios are possible with disclosed embodiments.

Figure 7:
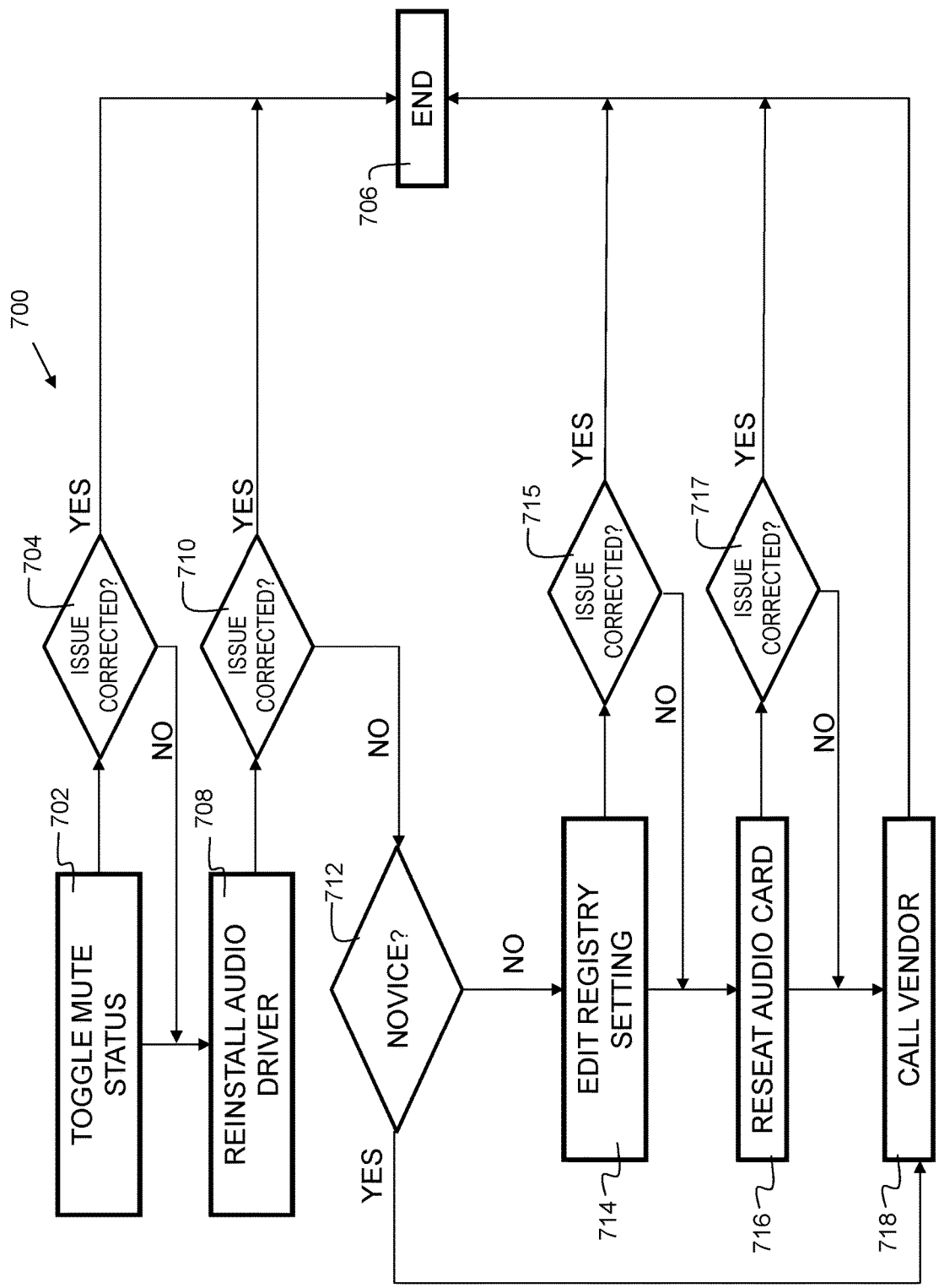
FIG. 7 shows an exemplary solution path for a device problem.

FIG. 7 shows an exemplary solution path 700 for a device problem. In the example, the device problem is that the user is unable to get any sound from the device speakers. At 702, there is presented instructions for a mute status toggle, which is the simplest remedy for the user to try. At 704, it is determined whether the toggle corrected the problem. If yes, the solution path is terminated at 706. If not, the process continues to 708 where there is presented instructions for a reinstall of an audio driver. At 710, it is determined whether the reinstall corrected the problem. If yes, the solution path is terminated at 706. If not, the process continues to 712, where it is determined whether the user is a novice (as the instructions that follow are for more complex solutions). In embodiments, determining the solution path comprises terminating the solution path based on the determined user experience level. If the user is deemed to be a novice, the solution path is terminated with the process continuing to 718 to call the vendor for support. If it is determined that the user is not a novice, at 714, there is a suggestion to perform an edit of a registry setting. This is generally considered to be a more advanced troubleshooting technique, since there is a risk of rendering the device inoperable if the registry is edited incorrectly. For that reason, this step may not be presented to users who are deemed to be a novice, or a child, as an example. At step 715, it is then determined whether the edit corrected the problem. If so, the solution path is terminated at 706. If not, the process continues to 716 where there is a reseating of an audio card. At 717, it is determined whether the reseating corrected the problem. If so, the process end at 706. If not, the solution path is terminated and the process continues to 718 where the user is prompted to call the vendor.

FIG. 8 shows an exemplary device message with a presented solution. In the example, the device is running an audio application. The application user interface 800 includes control buttons for play 804, stop 806, fast forward 808, and rewind 810. The user interface also includes device message 802: "No audio detected!—try mute and unmute". The detection of audio may occur automatically by monitoring output of a sound card, monitoring of a log file, and/or reading one or more hardware registers pertaining to audio. The hardware registers may provide audio information including amplitude level, sync word detection, time clock reference progression, and/or other indications of audio status.

FIG. 9 shows an example of retrieving information from a device log 900 on an electronic device. In some embodiments, detecting the device problem on the electronic device comprises retrieving information from a device log on the electronic device. In the example, the message including the string 904 (snd_via82xx) indicates a potential problem in the log 900.

Figure 10:
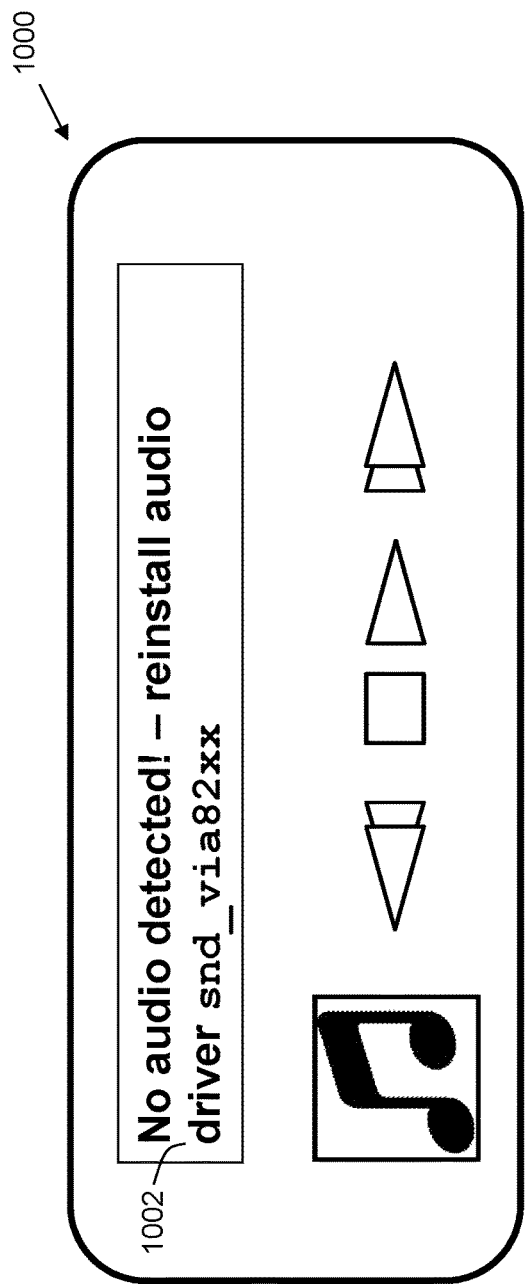
FIG. 10 shows an exemplary device message with additional suggested solutions.

FIG. 10 shows an exemplary device message with an additional presented solution. In the example, user interface 1000 includes the message 1002: "No audio detected!—reinstall audio driver snd_via82xx."

Figure 11:
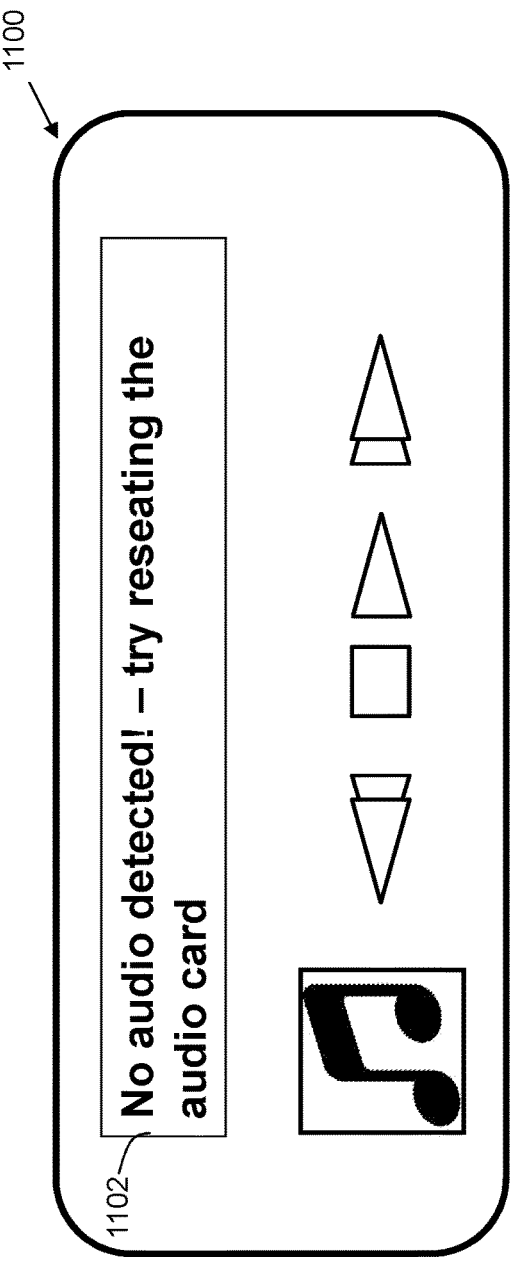
FIG. 11 shows an exemplary device message with additional suggested solutions.

FIG. 11 shows an exemplary device message with an additional presented solution. In the example, user interface 1100 includes the message 1102 in text form, "No audio detected!—try reseating the audio card."

Figure 12:
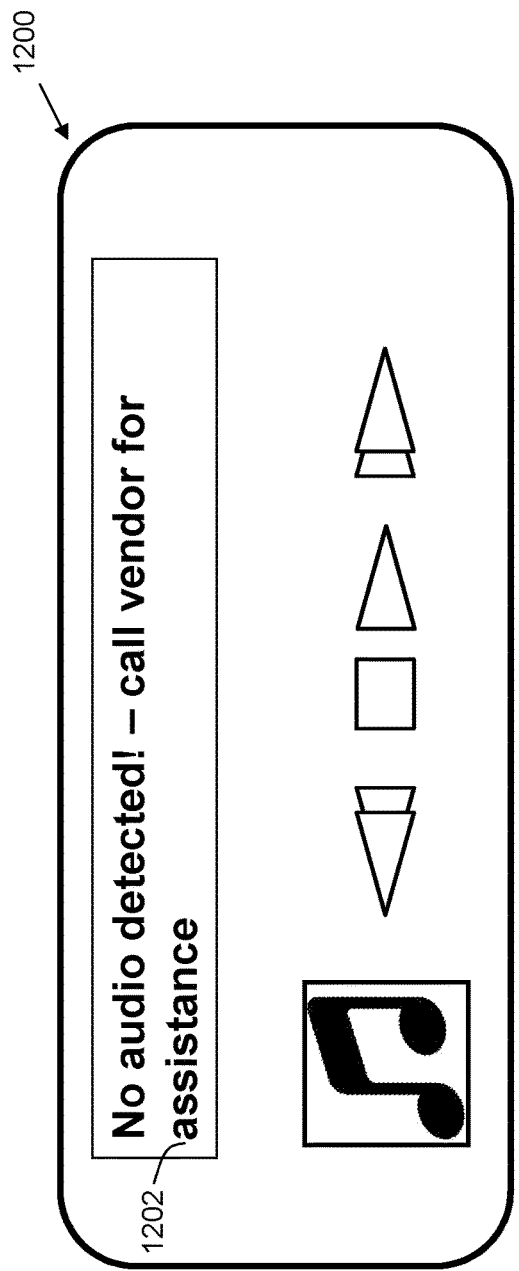
FIG. 12 shows an exemplary device message with additional suggested solutions.

FIG. 12 shows an exemplary device message with an additional presented solution. In the example, user interface 1200 includes the message 1202: "No audio detected!—call vendor for assistance." This message is an example of terminating the solution path (i.e., based on user experience level).

Figure 13:
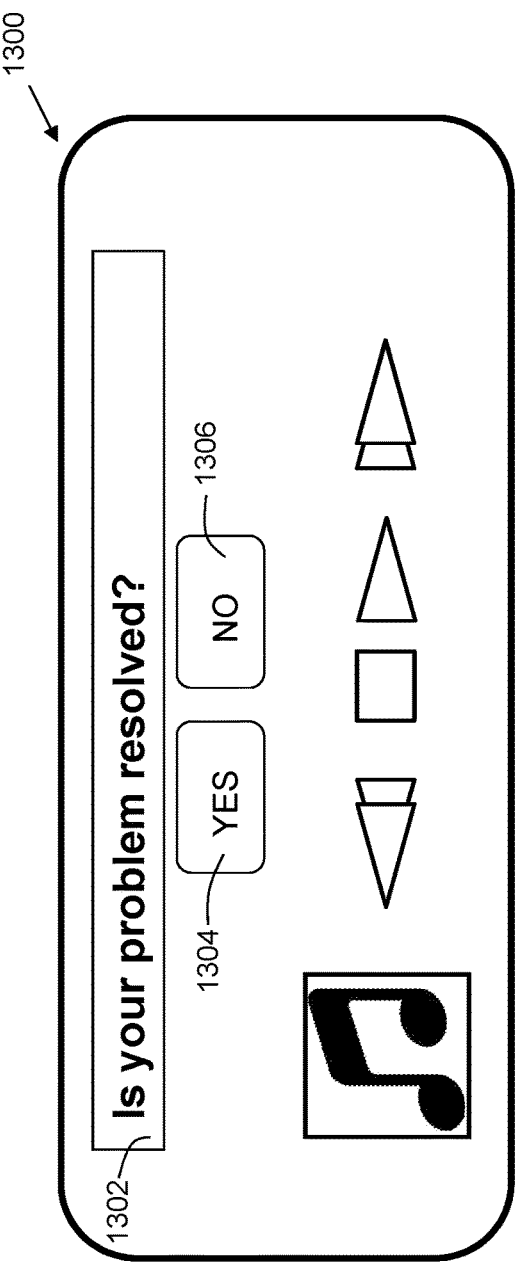
FIG. 13 shows an exemplary problem resolution confirmation dialog.

FIG. 13 shows an exemplary problem resolution confirmation dialog. In the example, user interface 1300 includes the problem resolution confirmation request 1302 in text form, "Is your problem resolved?" The message includes a user input device, such as buttons 1304 and 1306. Button 1304 allows the user to answer the question positively, and button 1306 allows the user to answer the question negatively. In some embodiments, the resolution may be automatically detected. In embodiments, the automatic detection can include monitoring output of a sound card or speaker, monitoring of a log file, and/or reading one or more hardware registers pertaining to audio. The hardware registers may provide audio information including amplitude level, sync word detection, time clock reference progression, and/or other indications of audio status.

Figure 14:
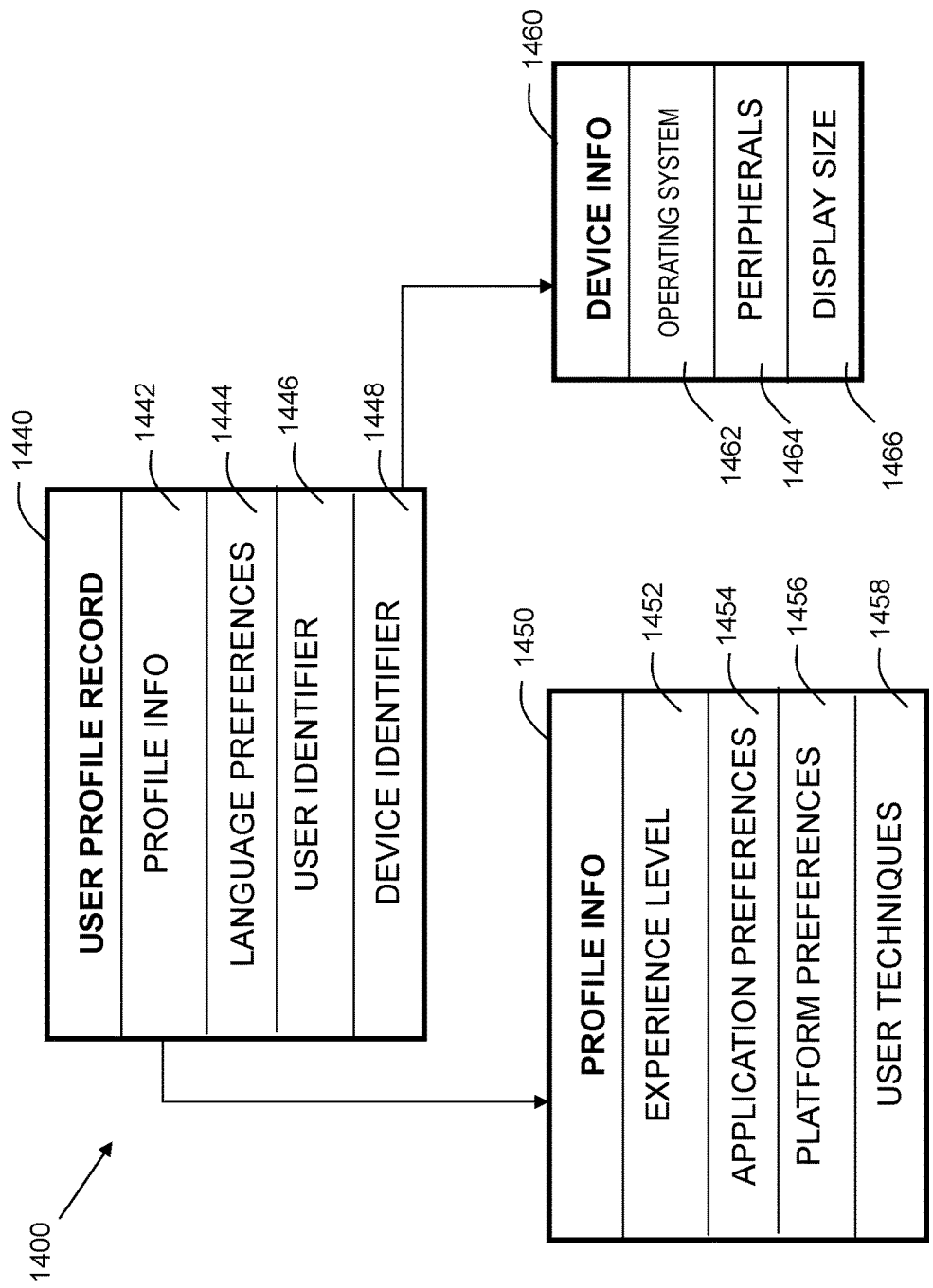
FIG. 14 shows data structures used in accordance with embodiments of the present invention.

FIG. 14 shows a diagram 1400 of data structures used in accordance with embodiments of the present invention. The example data structures may be stored in user database 156 of FIG. 1 or in another suitable location. In the example, there are three connected data tables, User Profile Record table 1440, Profile Info table 1450, and Device Info table 1460. Note that the tables and data stored therein are examples, and any suitable configuration or stored data is included within the scope of the invention.

In User Profile Record table 1440, there are fields storing the following data: profile info 1442, language preferences 1444, user identifier 1446, and device identifier 1448. Profile info data 1442 may include a user's name, age, or other personal data. Language preferences 1444 enables presentation of solution instructions for solutions in the solution path in a language and/or complexity the user can understand or prefers. A user cluster associated with novice users may be presented with simplified instructions, whereas a user cluster associated with experienced users may be presented with more detailed instructions, which may include technical jargon and/or advanced terminology. Thus, embodiments can further comprise adjusting a complexity of the provided instructions based on the determined user cluster.

In embodiments, the language preference can include categories of a spoken language, such as English, Spanish, French, etc. In some embodiments, the language preference can include a complexity setting, which can include categories such as beginner and expert, and/or technical and non-technical. Based on the selected language preference, the text provided for one or more of the presented solutions may be adjusted. User identifier 1446 may be an alphanumerical/symbolic or other type of identifier unique to a user so as to associate the user with other data. Device identifier 1448 may be an alphanumerical/symbolic or other type of identifier unique to a particular electronic device with a user.

In Profile Info table 1450, there are fields storing the following data: experience level 1452, application preferences 1454, platform preferences 1456, and user techniques 1458. Experience level data 1452 includes data on a user's level or experience, skill, and/or proficiency in one or more areas. Application preferences 1454 enable presentation of solution instructions in solution paths in a preferred application. Platform preferences data 1456 enables presentation of solution instructions in solution paths on a preferred platform. User techniques are a user's preferred way of operating the electronic device. The preferred way may be determined based on user history (e.g., based on most frequent use, average over time, etc.). For example, some users may prefer controlling the electronic device using a mouse, while others may prefer using keystroke combinations. In embodiments, the provided instructions in the solution path can be based on this preference. For example, for a user who prefers keystroke operation, the user can be presented with keystroke instructions (e.g., Ctrl-V to paste text). Similarly, for a user who prefers mouse control, the user can be provided with mouse-based instructions (e.g., use the mouse to select the Edit Menu, and then select Paste).

In Device Info table 1460, there are fields storing the following data: operating system 1462, peripherals 1464, and display size 1466. Display size 1466 may have an impact on what solution is provided in the solution path as less items may be displayed, or items (like font size) must be displayed smaller on a small screen as compared to a larger screen. Peripherals data 1464 indicates what peripherals are connected, e.g., mouse, printer, scanner, camera, or microphone, etc. The peripherals may play a role in what solutions are provided based on compatibility. For example, incompatible solutions for a peripheral are not included in the solution path. Operating system 1462 enables solutions to be included in the solution path that can run on, or are compatible with, the particular installed operating system.

Figure 15:
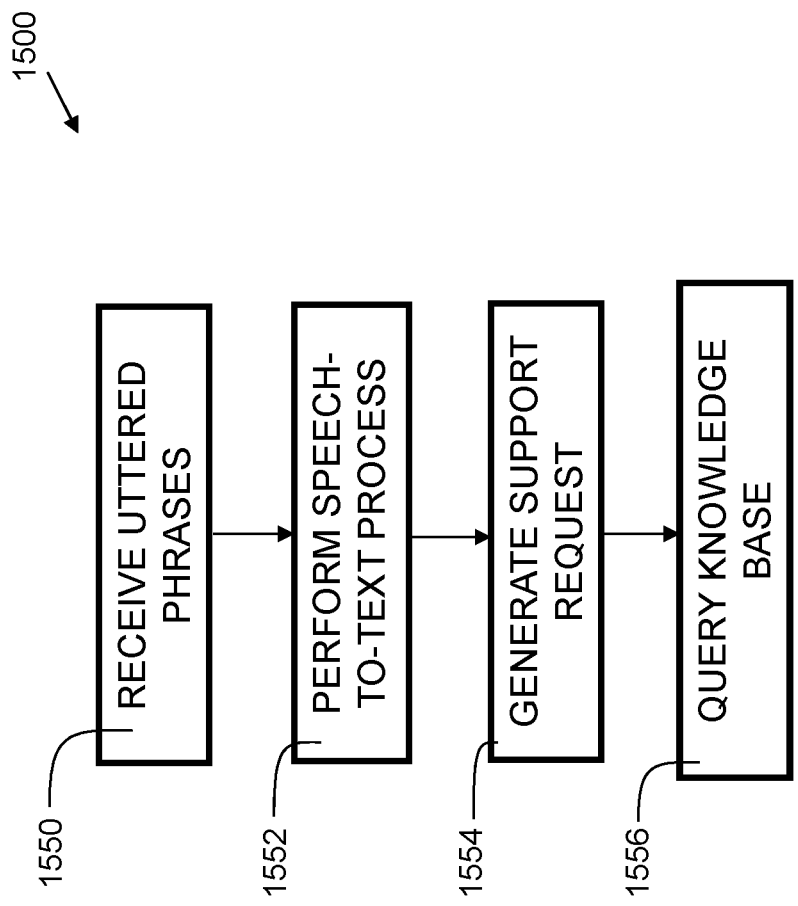
FIG. 15 is a flowchart indicating process steps for voice activated support requests in accordance with embodiments of the present invention.

FIG. 15 is a flowchart 1500 indicating process steps for voice activated support requests in accordance with embodiments of the present invention. Some embodiments may be voice activated and responsive, and work with so-called "smart speakers" such as Alexa™ or Google Home™. At 1550, uttered phrases are received. A user may speak into a microphone connected, or wirelessly in communication, with the device. At 1552, a speech-to-text process is performed. At 1554, a support request is generated based on the result of the speech-to-text data. At 1556, a knowledge base is queried for possible solutions for a solution path.

Figure 16:
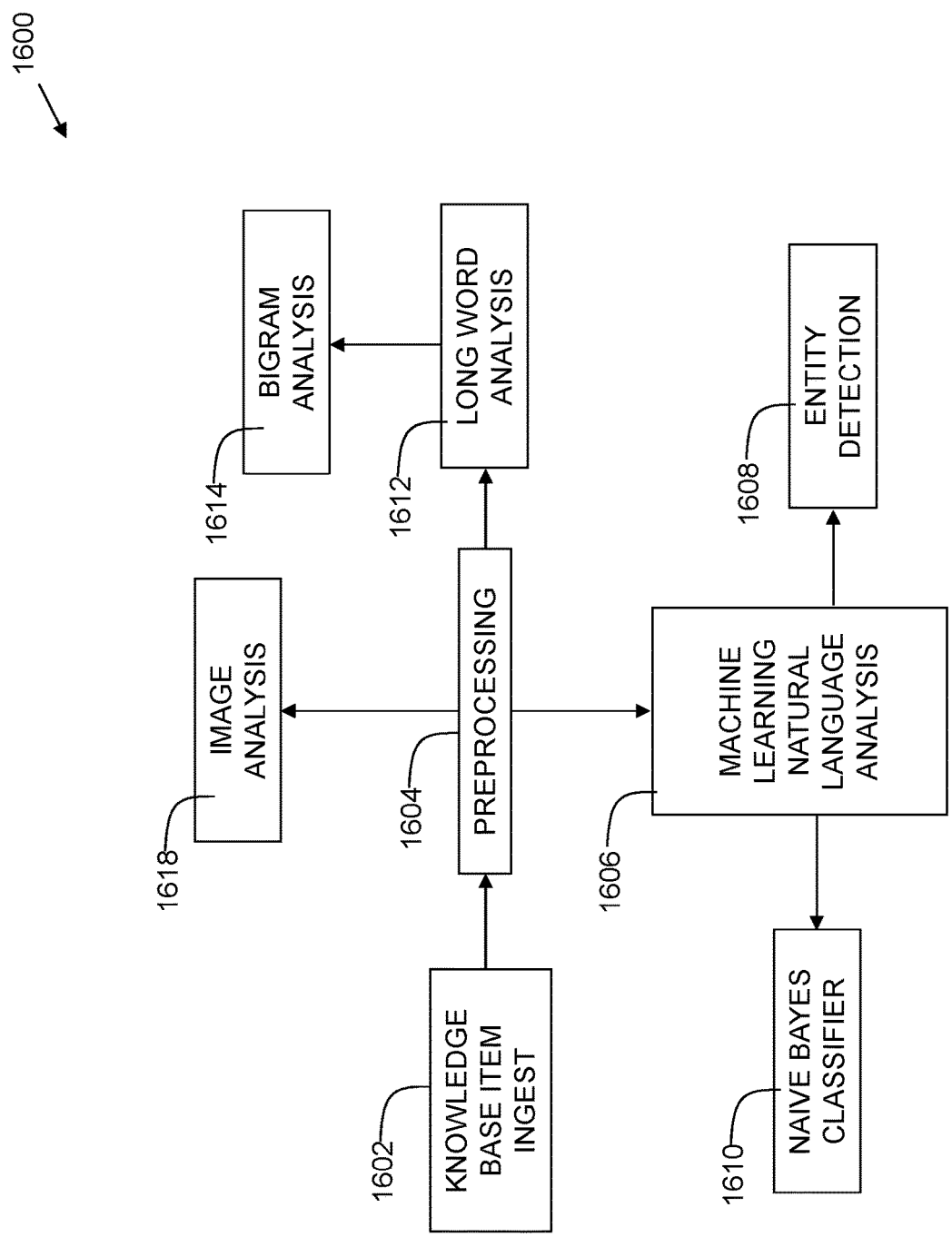
FIG. 16 is a flowchart indicating process steps for knowledge base item processing in accordance with embodiments of the present invention.

FIG. 16 is a flowchart 1600 indicating process steps for knowledge base item processing in accordance with embodiments of the present invention. At 1602, the knowledge base item is ingested into system 102 (FIG. 1). The knowledge base item ingest may include importing of a corpus or raw text, scraping of web pages, electronic user manuals, and/or any other suitable information. At 1604, the data from the ingest is then preprocessed for indexing. This includes performing a computer-generated topic analysis for each knowledge base item. The topic analysis can be used to generate keywords that are associated with the knowledge base item. An index, comprising at least one entry for each knowledge base item, is created for use as a potential solution in a solution path. This information may be stored in another knowledge base, and/or in the storage of the automated technical support system.

Each knowledge base item (i.e., article, white paper, online instruction manual, etc.) can include one or more topic keywords associated therewith. In embodiments, a machine learning natural language analysis 1606 of the knowledge base item is performed. The natural language analysis may include, but is not limited to, indexing, concordance, stop word processing, bigram processing, dispersion analysis, lexical richness analysis (ratio of distinct words to total words), disambiguation, part-of-speech analysis, anaphora resolution (the process of identifying what a pronoun or noun phrase refers to), or any other suitable process.

In some embodiments, the machine learning natural language analysis 1606 comprises performing an entity detection process 1608 on text data from one or more knowledge items. A topic is then derived based on each entity detected from the entity detection process. The derived topic and corresponding knowledge base item is recorded in a topic index. The topic index includes entries of topic keywords assigned to various knowledge base items. The index may be comprised of database tables in knowledge base(s) 152 illustrated in FIG. 1. Any suitable configuration of the index is included within the scope of the invention.

The entity detection may include extraction, which is the detection and preparation of named entity occurrences. The extraction phase includes POS (part of speech) tagging, tokenization, sentence boundary detection, capitalization rules and in-document statistics. The entity detection may further include noun identification, followed by identifying a subset of nouns including proper nouns and nouns deemed to be topically pertinent. The extracted entities may be used as keywords to populate a topic index.

In some embodiments, the computerized natural language analysis 1606 comprises performing a long word analysis at 1612, which may include a bigram analysis at 1614. In some embodiments, performing a computerized natural language analysis 1606 comprises using a naive Bayes classifier at 1610. Other classifiers and/or machine learning techniques may be used with embodiments of the present invention. In some embodiments, a regression analysis may be used to derive a correlation between topics and corresponding knowledge base items.

At 1618, the topic analysis for each knowledge base item comprises performing an image analysis for the knowledge base item. The image analysis may include using edge detection processes, gradient detection processes, and other suitable processes to detect and identify objects in an image. Based on the identification, one or more topic keywords may be assigned to the knowledge base item. For example, if an image of a hard disk drive is present in a document, then a keyword of "hard disk drive" may be entered as an entry for the knowledge base item in a topic index.

FIG. 17 shows an example 1700 of a bigram analysis in accordance with embodiments of the present invention. Bigram analysis is one of the computerized natural language analysis processes that may be utilized in embodiments of the present invention for discerning the topics of familiarity and/or experience level of a user. In some embodiments, the topic analysis for each knowledge base item comprises a long word analysis (1612 of FIG. 16). The long word analysis may include performing a bigram analysis (1614 of FIG. 16). In a bigram analysis, a pair of words in a particular order may be searched for within a body of text of an input query and/or a verbal utterance. Based on the analyses, one or more topic keywords may be assigned to the knowledge base item. In this example, the bigram "computer storage" is searched within a text excerpt. Three occurrences, indicated as 1702A, 1702B, and 1702C are present in the text passage. In embodiments, the usage of bigrams, trigrams, or more generally, n-grams (number=n), may be used to improve relevance in discerning the topics of the text entered into an electronic computing device by a user.

Figure 18:
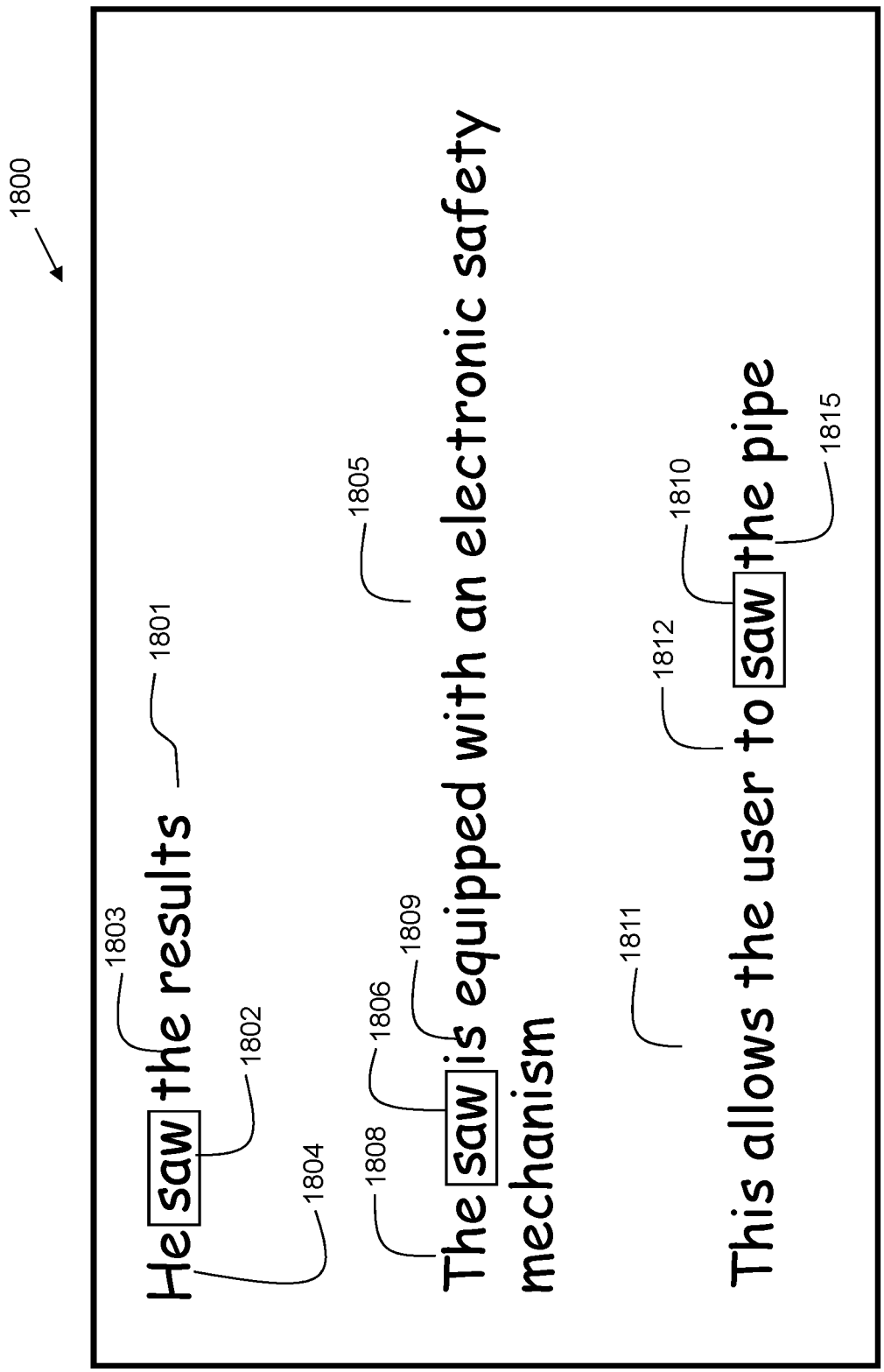
FIG. 18 shows an example of disambiguation in accordance with embodiments of the present invention.

FIG. 18 shows an example 1800 of disambiguation in accordance with embodiments of the present invention. Disambiguation is one of the computerized natural language analysis processes that may be utilized in embodiments of the present invention for discerning the topics of familiarity and/or experience level of a user. As part of knowledge base item ingest and analysis of the text within a knowledge base item, text may be tokenized into words and tagged with parts of speech. For some words, there can be more than one meaning and/or part of speech.

Example 1800 shows a disambiguation example with the word "saw." In phrase 1801, the word "saw" 1802 is a past tense verb. In embodiments, a machine learning natural language analysis module may identify the prior token 1804 to the word "saw" as a pronoun, and the following token 1803 as an article. In training a classifier, the pattern of pronoun-token-article may be associated with a verb, and thus the token is interpreted as a verb.

In phrase 1805, the word "saw" 1806 is a noun for a cutting tool. In embodiments, a machine learning natural language analysis module may identify the prior token 1808 to the word saw as an article, and the following token 1809 as a verb. In training a classifier, the pattern article-token-verb may be associated with a noun, and thus the token is interpreted as a noun.

In phrase 1811, the word "saw" 1810 is an infinitive verb. In embodiments, a machine learning natural language analysis module may identify the prior token 1812 to the word "saw" as part of an infinitive form, and the following token 1815 as an article. In training a classifier, the pattern "to"-token-article may be associated with a verb, and thus the token is interpreted as a verb. These classifiers and techniques for disambiguation are examples, and other classifiers and techniques are possible.

Figure 19:
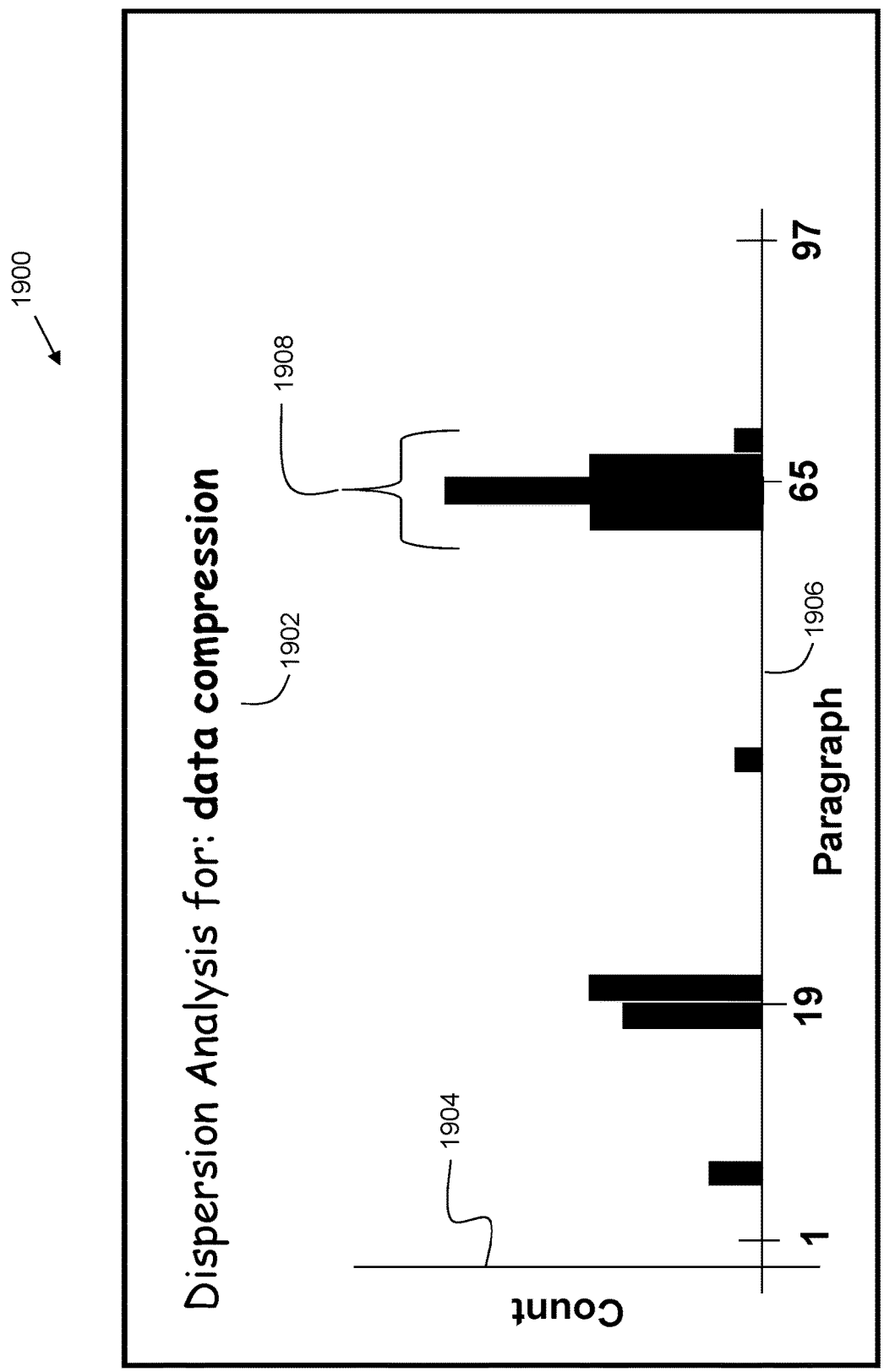
FIG. 19 shows an example of a dispersion analysis in accordance with embodiments of the present invention.

FIG. 19 shows an example 1900 of a dispersion analysis in accordance with embodiments of the present invention. The dispersion analysis is another technique that may be used to discern the subject of text entered into an electronic device by a user. In some embodiments, the performing a computerized machine learning natural language analysis (1606 of FIG. 16) comprises performing a dispersion analysis. In a document having 97 paragraphs, a particular word may have a non-uniform distribution within the document. In the example, a dispersion analysis is performed for the phrase "data compression" 1902 within the document. A graph comprises a horizontal axis 1906 representing a paragraph number within the document, and a vertical axis 1904 representing a number of occurrences of keyword 1902 in the document. As can be seen in the graph, the presence of the keyword 1902 is concentrated in certain paragraphs. A maximum concentration 1908 is identified in the area around paragraph 65. In embodiments, paragraphs in proximity to the maximum concentration of the dispersion analysis have the keyword 1902 loaded into the respective topic indexes. The dispersion analysis can provide an indication of relevance. In the example 1900, the keyword (category) 1902 is "data compression." In such an example, if a user was experiencing a problem with a data compression application, he/she may be deemed an expert based on the dispersion analysis, which indicates a concentration (e.g., at paragraph 65 of a document the user had typed) of text pertaining to data compression.

As can now be appreciated, disclosed embodiments provide techniques for automated technical support for problems with an electronic device. The problems may be automatically detected based on system status, log file strings, and/or other suitable techniques. One or more potential solutions are provided to a user based on his/her assessed cognitive capabilities, user preferences, general expertise with the electronic device and/or applications executing thereon, and which solution has worked or not worked for similar users. The potential solutions can come from one or more knowledge bases. Users of similar cognitive and/or expertise levels may be grouped into clusters. Successful resolutions may be associated with a cluster. The successful resolutions and associated clusters may be input into a machine learning algorithm such as a neural network. In this way, over time, a system in accordance with embodiments of the present invention can be trained to improve the effectiveness of recommended solutions. Thus, disclosed embodiments can improve the technical field of diagnostics and technical support. This can serve to reduce downtime, improve customer satisfaction, and reduce operating costs for organizations, as problems can be resolved efficiently with little or no human interaction.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer implemented method for device technical support for a user, comprising:
   determining a user cluster corresponding to the user;
   detecting a device problem on an electronic device corresponding to the user;
   determining, using a machine learning algorithm, a solution path for the device problem, wherein the solution path has a plurality of solutions that are based on the device problem and the user cluster and that are queued on the solution path sorted from simplest to most complex;
   providing instructions corresponding to the solution path to the user;
   determining a solution path success result;
   recording the solution path success result; and
   inputting the results are into the machine learning algorithm to further train the machine learning algorithm whether the solutions in the solution path work for the user cluster.

2. The method of claim 1, wherein determining the user cluster comprises:
   automatically determining a user experience level based on a set of user interactions with the electronic device; and
   assigning the user to one of a plurality of user clusters with other users based on the user experience level.

3. The method of claim 2, wherein determining a user experience level comprises:
   performing a lexical analysis of content that the user enters into the electronic device over time as the electronic device is being used by the user to determine grammar correctness, and spelling correctness of the words in the content;
   performing a graphical navigation analysis that including an analysis of type speed, click speed, spelling accuracy, and grammar accuracy of the words in the content;

determining at least one of an age of the user or an education level of the user based on the graphical navigation analysis;
performing a dispersion analysis of the words in the content to determine topics with which the user has experience; and
determining the user experience level with respect to the device problem based on the lexical analysis, the graphical navigation analysis, and the dispersion analysis.

4. The method of claim 2, wherein determining the solution path further comprises:
beginning the solution path with a set of solutions that are common for users having all determined user experience levels; and
terminating the solution path based on the determined user experience level such that a smaller set of instructions for more simple solutions to the device problem is provided to a first user that has a lower determined user experience level and a longer set of instructions that include additional more difficult instructions for more complex solutions to the device problem is provided to a second user that has a higher determined user experience level.

5. The method of claim 2, wherein determining a user experience level comprises:
performing a user interface navigation analysis of the user, and
determining the user experience level based on the user interface navigation analysis.

6. The method of claim 1, further comprising adjusting a complexity of the provided instructions based on the determined user cluster.

7. The method of claim 1, wherein determining the user cluster comprises:
determining an application user preference based on historical usage data of applications by the user;
determining a platform preference of the user based on historical usage data of platforms by the user; and
determining the user experience level with respect to the device problem based on the application user preference and the platform preference.

8. The method of claim 1, wherein detecting the device problem on the electronic device comprises retrieving information from a device log on the electronic device.

9. An electronic computing device comprising:
a processor;
a memory coupled to the processor, the memory containing instructions, that when executed by the processor, perform the steps of:
determining a user cluster corresponding to a user;
detecting a device problem on an electronic device corresponding to the user;
determining, using a machine learning algorithm, a solution path for the device problem, wherein the solution path has a plurality of solutions that are based on the device problem and the user cluster and that are queued on the solution path sorted from simplest to most complex a solution path for the device problem, wherein the solution path is based on the device problem and the user cluster;
providing instructions corresponding to the solution path to the user;
determining a solution path success result;
recording the solution path success result; and
inputting the results are into the machine learning algorithm to further train the machine learning algorithm whether the solutions in the solution path work for the user cluster.

10. The electronic computing device of claim 9, wherein the memory further comprises instructions, that when executed by the processor, perform the steps of:
automatically determining a user experience level based on a set of user interactions with the electronic device; and
assigning the user to one of a plurality of user clusters with other users based on the user experience level.

11. The electronic computing device of claim 10, wherein the memory further comprises instructions, that when executed by the processor, perform the steps of:
performing a lexical analysis of content that the user enters into the electronic device over time as the electronic device is being used by the user to determine grammar correctness, and spelling correctness of the words in the content;
performing a graphical navigation analysis that including an analysis of type speed, click speed, spelling accuracy, and grammar accuracy of the words in the content;
determining at least one of an age of the user or an education level of the user based on the graphical navigation analysis;
performing a dispersion analysis of the words in the content to determine topics with which the user has experience;
determining an application user preference based on historical usage data of applications by the user;
determining a platform user preference based on historical usage data of platforms by the user; and
determining the user experience level with respect to the device problem based on the lexical analysis, the graphical navigation analysis, and the dispersion analysis.

12. The electronic computing device of claim 10, wherein the memory further comprises instructions, that when executed by the processor, perform the steps of:
performing a user interface navigation analysis of the user, and
determining the user experience level based on the user interface navigation analysis.

13. The electronic computing device of claim 10, wherein the memory further comprises instructions, that when executed by the processor, perform the steps of:
beginning the solution path with a set of solutions that are common for users having all determined user experience levels; and
terminating the solution path based on the determined user experience level such that a smaller set of instructions for more simple solutions to the device problem is provided to a first user that has a lower determined user experience level and a longer set of instructions that include additional more difficult instructions for more complex solutions to the device problem is provided to a second user that has a higher determined user experience level.

14. The electronic computing device of claim 9, wherein the memory further comprises instructions, that when executed by the processor, perform the steps of:
determining an application user preference; and
determining the user experience level with respect to the device problem based on the application user preference.

15. The electronic computing device of claim 9, wherein the memory further comprises instructions, that when executed by the processor, perform the steps of:
  determining a platform preference of the user based on historical usage data of platforms by the user; and
  determining the user experience level with respect to the device problem based on the platform preference.

16. A computer program product for an electronic computing device comprising a computer readable storage medium having program instructions embodied therewith, the program instructions executable by a processor to cause the electronic computing device to:
  determine a user cluster corresponding to a user;
  detect a device problem on an electronic device corresponding to the user;
  determine, using a machine learning algorithm, a solution path for the device problem, wherein the solution path has a plurality of solutions that are based on the device problem and the user cluster and that are queued on the solution path sorted from simplest to most complex;
  provide instructions corresponding to the solution path to the user;
  determine a solution path success result;
  record the solution path success result; and
  input the results are into the machine learning algorithm to further train the machine learning algorithm whether the solutions in the solution path work for the user cluster.

17. The computer program product of claim 16, wherein the computer readable storage medium includes program instructions executable by the processor to cause the electronic computing device to:
  automatically determine a user experience level based on a set of user interactions with the electronic device; and
  assign the user to one of a plurality of user clusters with other users based on the user experience level.

18. The computer program product of claim 17, wherein the computer readable storage medium includes program instructions executable by the processor to cause the electronic computing device to:
  perform a lexical analysis of content that the user enters into the electronic device over time as the electronic device is being used by the user to determine grammar correctness, and spelling correctness of the words in the content;
  perform a graphical navigation analysis that including an analysis of type speed, click speed, spelling accuracy, and grammar accuracy of the words in the content;
  determine at least one of an age of the user or an education level of the user based on the graphical navigation analysis;
  perform a dispersion analysis of the words in the content to determine topics with which the user has experience;
  determine an application user preference based on historical usage data of applications by the user;
  determine a platform preference of the user based on historical usage data of platforms by the user; and
  determine the user experience level with respect to the device problem based on the lexical analysis, the graphical navigation analysis, the dispersion analysis, the application user preference, and the platform preference.

19. The computer program product of claim 17, wherein the computer readable storage medium includes program instructions executable by the processor to cause the electronic computing device to:
  perform a user interface navigation analysis of the user, and
  determine the user experience level based on the user interface navigation analysis.

20. The computer program product of claim 17, wherein the computer readable storage medium includes program instructions executable by the processor to cause the electronic computing device to:
  beginning the solution path with a set of solutions that are common for users having all determined user experience levels; and
  terminating the solution path based on the determined user experience level such that a smaller set of instructions for more simple solutions to the device problem is provided to a first user that has a lower determined user experience level and a longer set of instructions that include additional more difficult instructions for more complex solutions to the device problem is provided to a second user that has a higher determined user experience level.

* * * * *